(12) United States Patent
Plum

(10) Patent No.: US 6,547,489 B2
(45) Date of Patent: Apr. 15, 2003

(54) PROCESS FOR THE REMOVAL OF POLLUTANTS FROM THE SOIL

(75) Inventor: Martin W. J. Plum, Landgraaf (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/794,364

(22) Filed: Feb. 28, 2001

(65) Prior Publication Data

US 2001/0021336 A1 Sep. 13, 2001

(30) Foreign Application Priority Data

Mar. 7, 2000 (NL) .............................................. 1014573

(51) Int. Cl.[7] ................................................ B09B 3/00
(52) U.S. Cl. ................................. 405/128.45; 405/128.3
(58) Field of Search ...................... 405/128.1, 128.15, 405/128.2, 128.25, 128.3, 128.4, 128.35

(56) References Cited

U.S. PATENT DOCUMENTS

| 4,435,292 A | * | 3/1984 | Kirk et al. ................... 210/747 |
| 5,178,491 A | * | 1/1993 | Graves et al. ............... 166/246 |
| 5,345,034 A | | 9/1994 | Corey |
| 5,553,974 A | | 9/1996 | Nazarian |
| 5,584,605 A | * | 12/1996 | Beard et al. ................. 166/266 |
| 5,676,207 A | | 10/1997 | Simon et al. |
| 5,697,437 A | * | 12/1997 | Weidner et al. ............. 166/268 |
| 5,829,918 A | * | 11/1998 | Chintis ........................ 166/246 |

FOREIGN PATENT DOCUMENTS

| DE | 4131216 | | 4/1993 |
| EP | 0429137 A1 | * | 5/1991 |

* cited by examiner

Primary Examiner—David Bagnell
Assistant Examiner—John Kreck
(74) Attorney, Agent, or Firm—Pillsbury Winthrop LLP

(57) ABSTRACT

The invention relates to a process for removing pollutants from soil with the aid of a stripping gas which involves (a) injecting the stripping gas into the soil at the level of and/or under the pollutant, (b) volatilizing the pollutant with the stripping gas, so that it rises to the ground level above the pollutant, (c) collecting and further treatment of the volatilized pollutant, a pneumatic screen being provided in the soil along the circumference of the polluted area.

6 Claims, 3 Drawing Sheets

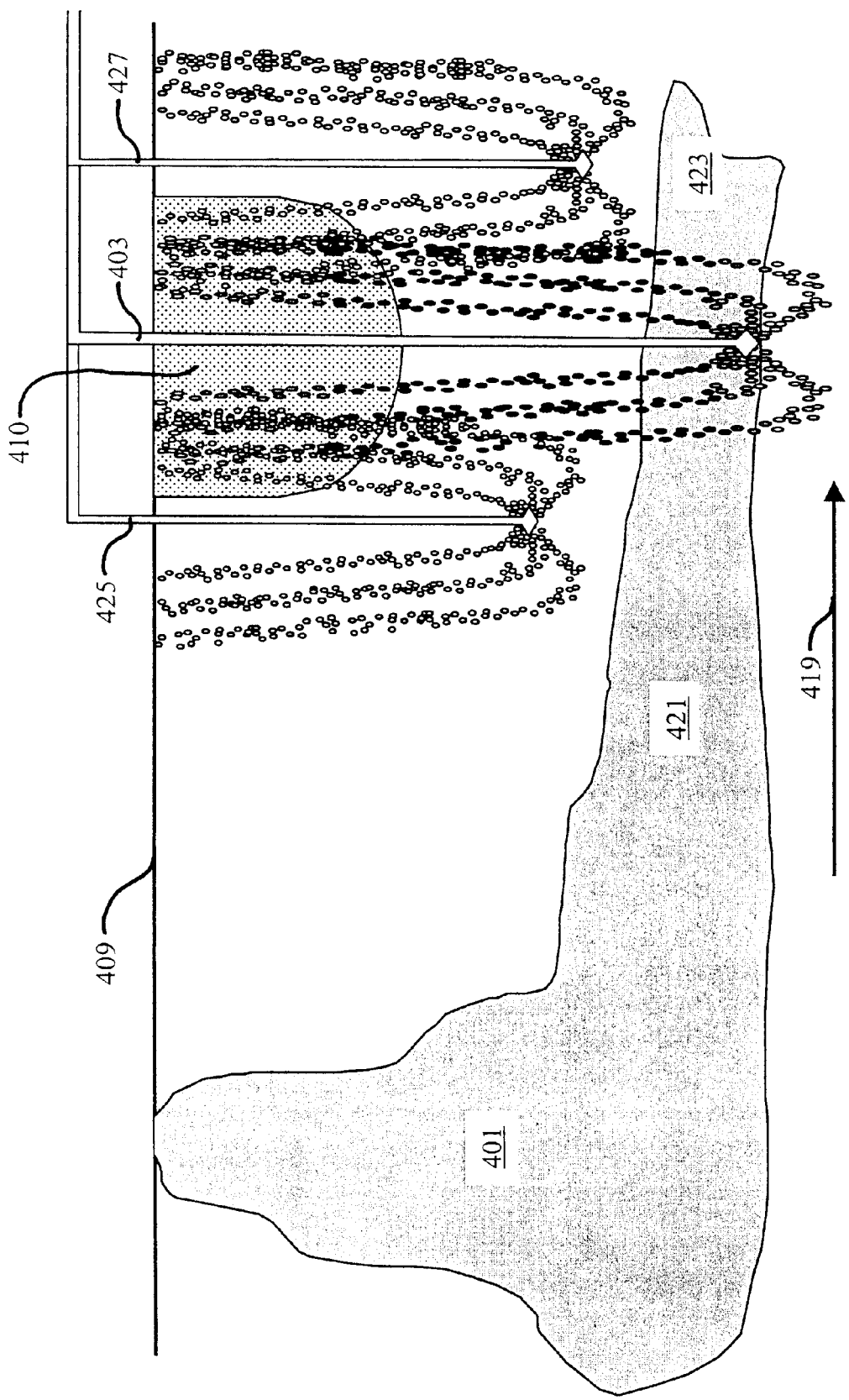

PROCESS FOR THE REMOVAL OF POLLUTANTS FROM THE SOIL

The invention relates to a process for the removal of pollutants from the soil with the aid of a stripping gas which involves (a) injecting the stripping gas into the soil at the level of and/or under the pollutant,
(b) volatilizing the pollutant with the stripping gas, so that it rises to ground level above the pollutant,
(c) collecting and further treatment of the volatilized pollutant.

Such a process is known from EP-A-429.137.

This publication describes a process for the removal of volatile pollutants from the soil by injecting air into the soil at the location of the pollutant. The injected air rises through the soil up to ground level and on its way up entrains the pollutants. In the known process the soil layer bounding the surface consists of biologically active material in which the pollutants are collected on their way up and degraded in situ.

A problem encountered in this method is that the injected air with the volatilized pollutant does not only move vertically but there is also a certain lateral component in its movement. As a result, part of the pollutant will be able to reach the ground level outside the biologically active layer and will thus be emitted to the ambient air without being degraded in said layer. To prevent this, the patent application referred to mentions the possibility of, for example, digging an infiltration trench around the polluted area or applying air-tight covers at ground level. It is also possible to install sheet piling around the place to be cleaned. Such a trench must be made around the entire circumference of the polluted area and will thus have a relatively large length. The same holds for the area of an air-tight layer to be applied. These measures are costly, hinder the work of third parties on the spot, such as for example production activities, and must furthermore be undone at a later stage, which again entails activities and other costs.

The same problem is encountered in another known process, in which the pollutants rising upward with the injected air are not degraded in a bioactive upper layer but are collected above the ground, for example under a screen, and conveyed to a facility for, for example, incineration or conversion into harmless substances in another manner.

The aim of the invention is to provide a process that prevents, in an economically more attractive way, the diffusion of the pollutant by the injected air flow to outside the area where the pollutants can be collected.

This aim is achieved according to the invention in that a pneumatic screen is installed in the soil outside the circumference of the polluted area.

A pneumatic screen is here understood to be a gas flow rising from a certain depth below ground level that extends continuously around the polluted area. It has been found that it is impossible or virtually impossible for laterally moving pollutants to pass through such a pneumatic screen and that they are removed to ground level within the area surrounded by the pneumatic screen.

In the above-mentioned EP application a reference is incidentally made to the possibility of also injecting stripping gas beside the pollutant but the possibility of doing this in the form of a pneumatic screen and as an alternative to the digging of a trench or the application of air-tight material to prevent diffusion of the pollutant is not divulged therein, nor can it be derived therefrom.

A further advantage of the process according to the invention is that it can also be used when the pollutant is wholly or partially situated under a layer that is impermeable to the volatilized pollutants, for example a concrete or asphalt floor, as often found in a plant or other production environment or around storage tanks. In that case the pneumatic screen is installed outside the nonpermeable part and then also encloses a permeable area where volatilized pollutants can reach ground level. By controlling the flow rate and/or the pressure of the injected gas flow along the pneumatic screen the pollutant can be driven in a desired direction, in particular in the direction of the permeable part of the area that is surrounded by the pneumatic screen. The stripping gas, which entrains the volatilized pollutant, can there reach ground level and, as the occasion arises, be treated by a bioactive layer present or applied there. If a bioactive layer is applied its thickness is preferably largest in the non-covered part that is closest to the area of the gas-impermeable layer. This has a favourable influence on the permeability of the soil there, which has a favourable influence on the gas flow in the soil in the direction of the bioactive layer. Further horizontal diffusion is prevented by the part of the pneumatic screen that surrounds the non-covered area. The presence of a pneumatic screen in the process according to the invention thus not only makes it possible to keep the pollutant localized within a chosen area but also to influence the place where the volatilized impurity reaches the surface. The distribution of the gas outflow over the screen is then set so that a resulting gas flow is set in a desired direction in the soil.

In the process according to the invention air can be used as stripping gas, if desired enriched with oxidizing components such as ozone or with other gaseous components. It is also possible to use nitrogen if it is desirable to work under anaerobic conditions. The gas used for the air screen, hereafter referred to as screening gas, can be the same gas as that used for the stripping gas. For price considerations air is generally the most attractive choice as screening gas.

As in the process known from EP-A-429.137, in the process according to the invention use is made of one or more hollow pipes to inject a pressurized stripping gas, preferably air, under the pollutant. The pipes are distributed over the area to be cleaned as uniformly as possible, preferably in a regular pattern of preferably equilateral triangles because it has been found that this gives the most uniform cleaning. The position of the outlet of the pipes is chosen so that the largest possible part of the stripping gas passes through the polluted soil to ground level. The outlet is situated in or, for at least a number of the pipes, under the pollutant. When the stripping gas flows through the polluted soil, the pollutant volatilizes upon which it is entrained to ground level. If the pollutant consists of volatile substances with a sufficiently high vapour pressure (for example acrylonitrile, benzene, toluene, xylene, acetone, styrene, phenol, perchloroethylene or trichloroethyelene), this volatilization takes place through evaporation. The pollutant is entrained in vapour form with the stripping gas passing through. Pollutants can also be volatilized by reaction with a stripping gas component, for example by an oxidizing agent such as a stripping gas enriched with ozone obtained by ozonization of air. The resulting reaction products volatilize while passing through the soil with the stripping gas and rise to ground level. Without further measures uncontrolled escape of the volatilized pollutant would take place at ground level and the pollutant would enter the atmosphere. To prevent this, the volatilized pollutant is collected above ground level for further processing or is passed, before escaping, through a biologically active layer in which the volatilized pollutant is wholly or partially degraded. The biologically active layer extends at least over the area where the pollutant will reach the surface and preferably over some distance outside it. In principle use can be made of the biological activity of the soil layer above the pollutant. Generally, however, it is necessary to upgrade the soil using additives so as to obtain a preconditioned biologically active layer and to maintain its activity at the required level. If upgrading of the soil at or just under ground level to obtain a biologically active layer is not or scarcely possible, use can be made of a layer of a few decimetres of preconditioned bioactive material applied at ground level.

If no measures are taken to prevent the lateral diffusion of the pollutant, the biologically active layer must extend over a considerable distance outside it, which is costly and leads to a considerable enlargement of the area to be treated. With the process according to the invention this area can practically be limited to the size of the area to be cleaned because the pneumatic screen can be applied practically adjacent to the circumference of the area to be cleaned. The stated advantages are obtained whilst retaining all the advantages of the known processes. After a short time already a high degree of removal of the pollutant is achieved and a relatively high differential pressure can be maintained between the inflowing and outflowing stripping gas.

Next to the pipes that are installed at the location of the pollutant for the volatilization and entrainment of the pollutant a pneumatic screen is installed. For this purpose for example a ring-shaped, substantially horizontal piping system can be installed in the soil at the desired depth. In the pipes outlets have then been provided at suitable distances. If pressurized screening gas is now fed to the system, the air flowing out through the openings forms a pneumatic screen. Number and diameter of the pipes, both those for the stripping gas and those for the pneumatic screen, and the size of the outlets therein, are chosen so that the desired quantity of gas with the desired pressure can be fed into the soil.

To avoid excavation work, also pipes of a suitable length and provided with outlets along at least a part of their length at such a mutual distance from each other that they partially overlap each other can be driven into the soil at a certain angle, for example between 10° and 75°, parallel or diagonally crossing each other. If pressurized screening gas is fed to these pipes, it will escape through the outlets and thus form a pneumatic screen.

In a preferred embodiment of the process according to the invention a series of pipes, for example of the same type as are used at the location of the pollutant, are provided vertically around the area to be cleaned with a deviation of at most 10°, thus forming a pneumatic screen, for example fitting in the pattern in which the pipes are installed at the location of the pollutant. To this end the pipes are installed in the soil in such a way that the outlets for the screening gas are located at a depth that is preferably at, or more preferably under, the level of the pollutant. Taking into account the permeability of the soil, the feasible flow rate and the feasible pressure, the distance between them is chosen so that the screen, due to the pattern of gas flow through the soil maintained by it, forces volatilized pollutants, which would tend to move in the direction of the screen, to move away from the screen and to the surface. In practice, suitable distances between the pipes are between 2 and 15 metres, and preferably they are between 4 and 10 metres. By carrying out measurements above the soil outside the pneumatic screen it is easy to establish whether pollutants reach the surface there. If this is found to take place, suitable measures can be taken, for example providing extra pipes or outlets between those already present for the formation of the screen or increasing the gas flow. The outflow velocity of the injected gas, measured at the surface, is as rule between 0.01 and 5 m/h, preferably between 0.03 and 2 m/h. The outflow velocity can simply be determined by collecting the quantity of outflowing gas over a certain area [$m^2$] during a certain time [$m^3/h$]. The distance from the pipes with which the pneumatic screen is formed to the boundary of the area to be cleaned can be 0.1 metre to a few metres, for example up to 10 metres. Preferably the pipes are placed within the area where the pollutants moving to the surface are collected or within the boundary of the area where the degrading bioactive layer is present, more preferably at least 0.5 metres inside it.

The velocity at which the gas is injected into the screen is so chosen, taking into account the distance and position of the pipes in the screen relative to the pipes within the pollutant, that on the side of the screen facing the pollutant the resulting gas flow is directed away from the screen to the location of the pollutant.

In the process according to the invention the diffusion of pollutants into the environment is prevented by merely extending the number of pipes with which gas is injected. This is considerably less drastic than digging trenches or the application of covering materials. Furthermore, removal of the extra pipes is cheaper and simpler than removing coverings and filling in trenches. Moreover, removal of the pipes immediately restores the landscape to its former condition. The pipes can also be sawn off at some depth under ground level and further be filled with, for example, bentonite to avoid possible inflow of unwanted substances from ground level to deep in the subsoil. In that case, too, the presence of the pipes is no longer visible on the surface.

The degradation can take place under aerobic conditions, for example in the case of acrylonitrile, benzene or toluene as pollutant. Anaerobic decomposition is also possible and is of advantage in the case of pollutants such as perchloroethylene and trichloroethyelene. In that case nitrogen can for example be injected as stripping gas.

The process according to the invention can be used when removing pollutants from dry soil situated above the groundwater level as well as wet soil situated wholly or partially below groundwater level. In a wet soil lateral diffusion of the pollutant also occurs due to currents in the ground water. In that case, too, the pneumatic screen that is used in the process according to the invention is found to form an effective barrier against underground expansion of the polluted spot and in particular against diffusion of the pollutant outside the area above which the biologically active layer or the cover is situated.

The process according to the invention can be used advantageously also where the current of the groundwater has already transported the pollutant to such a distance from the place of the original pollution, hereinafter also referred to as source, that volatilization over the entire area is no longer economically or practically feasible. The diffusion by the ground water as a rule has the shape of a plume, which is understood to be diffusion mainly in one direction that widens to some extent downstream as the distance from the source increases. The concentration of the pollutants in the plume as a rule decreases with the distance to the source of the pollutants. From a certain point of the plume the concentration will usually be so low as to be acceptable and removal is no longer legally required or otherwise useful or necessary.

If now, optionally in combination with the removal of the source of the pollution as described above, one or more pipes are introduced in the soil at the point in the plume where the concentration is acceptably low, and a stripping gas is injected through these, the pollutant will there be entrained to the surface as described above. There, the volatilized pollutant can then be collected and processed. At the location of the end of the plume the soil is preferably replaced to a certain depth by a layer of bioactive material. The thickness of this layer can amount to some metres but preferably ends above the pollutant. A layer of at least 2 and even 3 metres is preferred because the presence of such a bioactive layer causes the local resistance to air flows to be lower than that of the surrounding soil. As a consequence a flow pattern will be formed that preferentially conveys he rising injected stripping gas and the entrained pollutants through the bioactive layer. In the above-described positions around the area of the bioactive layer a pneumatic screen is now installed. The outlets of the pipes of the pneumatic screen that are placed upstream, seen in the direction of extension of the plume, are located above the pollutant. Thus the pollutant can pass under the pneumatic screen through this upstream part of the pneumatic screen and so reach the area where the injected stripping gas can volatilize it and convey it to and through the bioactive layer. The part of the pipes that form the pneumatic screen, which is installed downstream seen in the direction of extension of the plume, is placed outside the place to be cleaned, with their outlets at the same depth as the injection pipes or at a small distance, for example 0.1× the distance to the closest injection pipe, above it or under it.

In the course of time the pollutants present in the total plume will be transported by the groundwater flow to the area where stripping gas is injected and there, protected by the pneumatic screen against further diffusion outside the area where they can be collected, be eliminated in the bioactive layer situated above it. As a consequence, there is no need for local cleaning of the entire area of the plume but use is made of the observation that the pollutant moves in a predictable direction.

To accelerate the removal of the pollutants in a plume it is advantageous to create more cleaning sites, which are understood to mean combinations of injection pipes for stripping gas with a pneumatic screen and a bioactive layer as described above, in the area over which the plume extends. If for example a second cleaning site is installed halfway between the source and the end of the plume, the pollutant from the section of the plume that is closest to the source of the pollutant is collected at that second cleaning site and the pollutant from the section of the plume between the second cleaning site and the end of the plume at the cleaning site at the end of the plume. Thus the cleaning time for the whole plume is shortened considerably because the second cleaning site divides the plume into two parts that are degraded simultaneously. Depending on the length of the plume and the desired cleaning time several cleaning sites can be constructed.

In dry soil use can be made of a dry stripping gas. As a result of the introduction of dry stripping gas the soil will dry out and its porosity will increase so that the resistance against the stripping gas flowing through it decreases. The drying-out of the soil will also reduce the quantity of pollutants that can be retained by the soil and will promote evaporation.

It is also possible to heat the stripping gas. This increases the effect of drying of the stripping gas. If the pollutant is locally converted into volatile components, for example with an oxidizing agent, heating of the stripping gas also effects a higher conversion rate and thus a shorter clean-up time. By heating the stripping gas an optimum climate can be obtained in the biologically active layer also in cold weather conditions. When a dry and/or heated stripping gas is introduced, however, more attention is necessary for keeping the biologically active layer in the required condition. It is, for example, possible to keep the temperature in the biologically active layer at the required level with heated stripping gas and to water the biological active layer as required to keep the humidity at the required level.

The process according to the invention is explained on the basis of the following drawings figures, without however being limited thereto.

In the drawings

FIG. 4 is a cross section of an area where a pollutant is present in the soil of which a part has been entrained by the groundwater over a certain distance.

Figure 1:
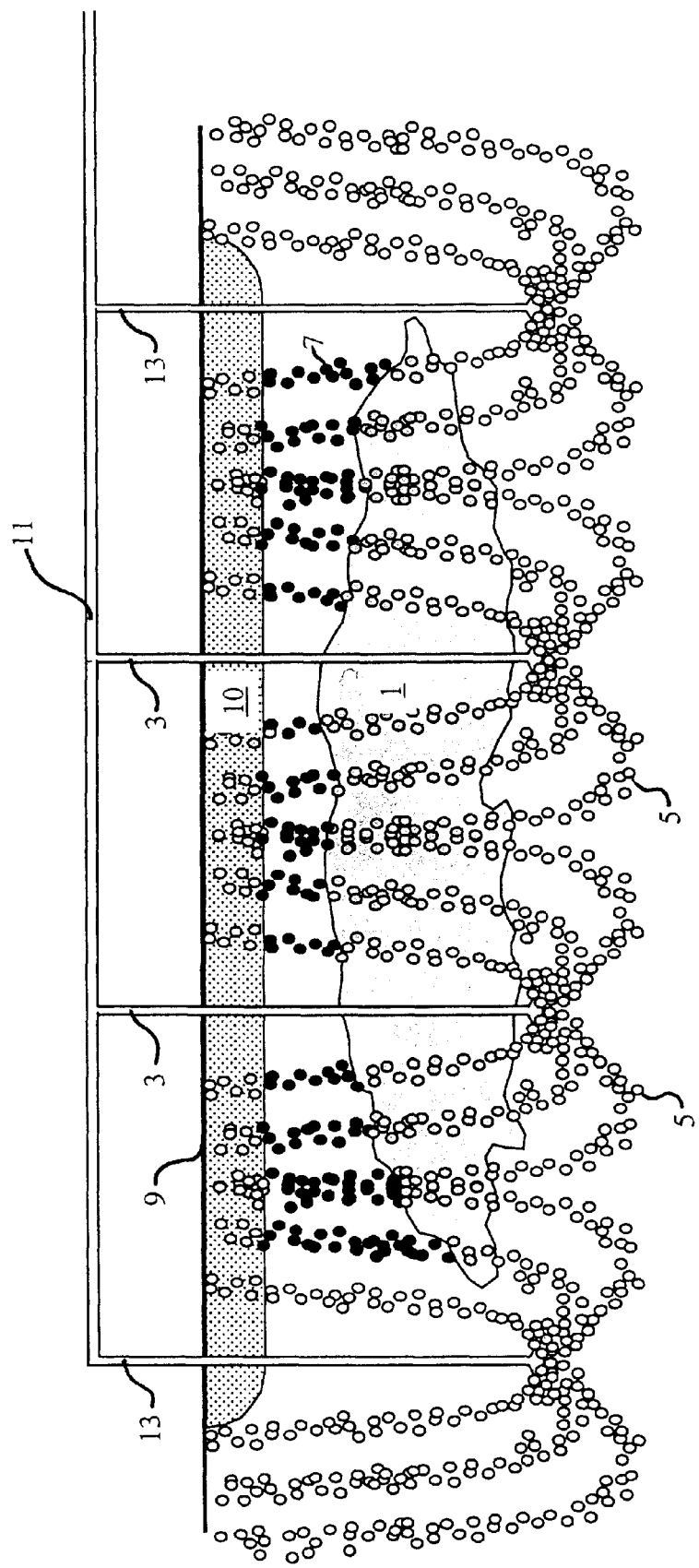
FIG. 1 is a cross section of a place where a pollutant is present in the soil.

In FIG. 1 is an underground pollutant. With the aid of pipes 3 a stripping gas is injected into the soil under the pollutant 1. The stripping gas, in this case air and indicated by the open circles 5, rises and entrains the volatilized pollutant. The volatilized pollutant, indicated by the closed circles 7, is subsequently conveyed through a biologically active layer 10 bordering the ground level 9 and is completely degraded there. To the feed line 11 pipes 13 have been connected that are installed outside the pollutant in the soil and that form the pneumatic screen. The outlets of these pipes lie at the same depth as those of the injection pipes 3

Figure 2:
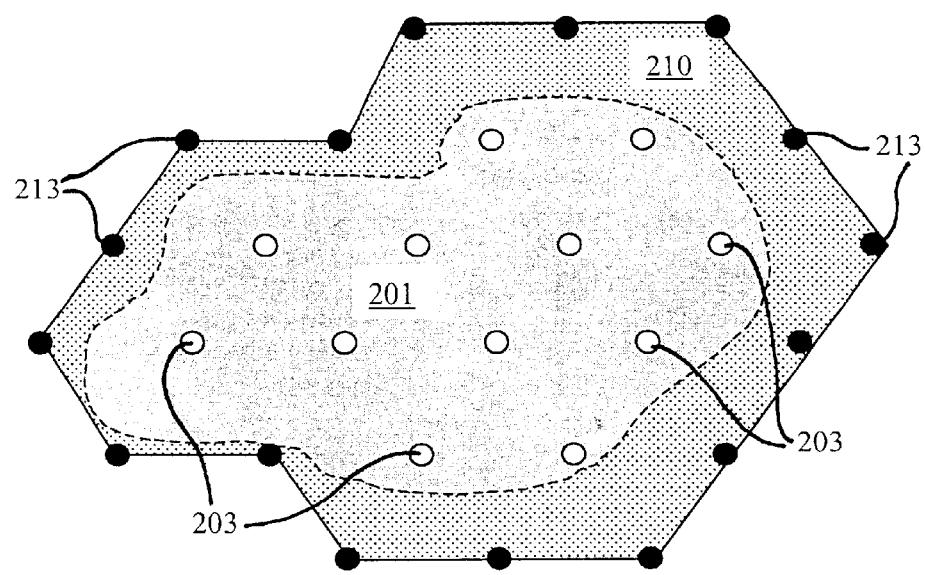
FIG. 2 is a top view of such a place.

FIG. 2 represents a top view of the polluted area. The boundary of an underground pollutant 201 is indicated by a dotted line, that of a bioactive layer 210 situated above it by an extended line. Within the area of the pollutant the open circles indicate the pipes 203 that are used to inject air for the volatilization of the pollutants. Pipes 213, indicated by closed circles, have been installed in a closed loop around the area to be cleaned and form the pneumatic screen when air is passed through these pipes 213. All pipes form part of a regular, in this case equilateral, pattern of triangles.

Figure 3:
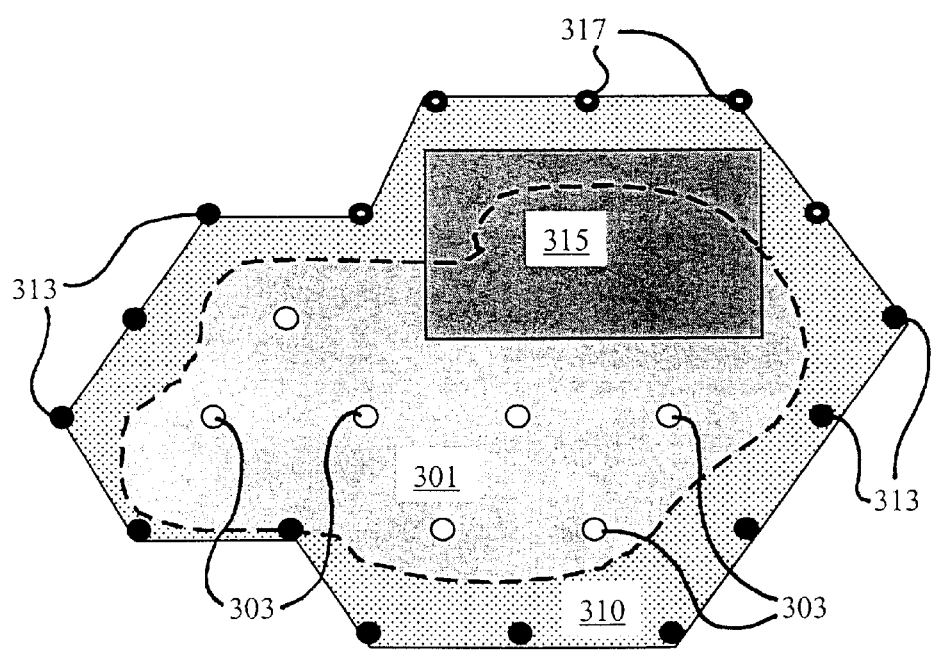
FIG. 3 is a top view of a place where an underground pollutant is present and where a part of the ground level is impermeable to volatilized pollutants.

FIG. 3 is as FIG. 2 except that a part of the underground pollutant 301 is situated under a layer 315 that is not permeable to the volatilized pollutants. Pipes 313 and 317 have been installed around the area to be cleaned. Through pipes 317, indicated by closed circles with an open centre, air is introduced into the soil under a higher pressure and at a higher flow rate than through pipes 313, indicated by closed circles. As a consequence, in the area under the covering layer a resulting air flow is formed in the direction of the area where a bioactive layer 310 is present above the pollutant. Through pipes 303, indicated by open circles, air is injected under the pollutant. To eliminate any traces of pollutant escaping along the side of the impenetrable layer facing away from the pollutant, the layer of bioactive material also extends along that side.

In FIG. 4 401 is underground pollutant from which the groundwater, which moves in the direction of the arrow 419, has entrained a quantity of pollutant that forms a plume 421. In the vicinity of the end 423 of the plume a pipe 403 has been installed to volatilize the pollutant and entrain it to the ground level 409. The volatilized pollutants are collected in a locally provided layer of bioactive material 410, which is thick in comparison with the situation in the preceding figures, and are degraded therein. Pipe 425 has been installed upstream of pipe 403 and forms part of the pneumatic screen. Its outlet ends above the plume 421 so that the groundwater containing entrained pollutants can pass through the pneumatic screen and can reach the area aerated by pipe 403. The downstream pipe 427 also forms part of the pneumatic screen and ends above the plume. The end section 423 of the plume, where the pollutant concentration has an acceptably low level, will be further entrained by the groundwater and be diluted further in the process.

What is claimed is:

1. A process for removing pollutants from soil with the aid of a stripping gas which comprises
    (a) injecting the stripping gas into the soil at the level of and/or under the pollutant,
    (b) volatilizing the pollutant with the stripping gas, so that it rises to the ground level above the pollutant,
    (c) collecting and treating the volatilized pollutant, and
    (d) providing a screening gas forming a pneumatic screen in the soil along the circumference of the polluted area by injecting said screening gas into the soil with the aid of substantially vertical pipes that have been installed in a closed loop around the circumference of the polluted area.

2. Process according to claim 1, further comprising, setting the flow of the screening gas over the pneumatic screen so that flow of the stripping gas is in a desired direction in the soil.

3. Process for constraining the flow of a stripping gas used to remove volatilized pollutants from a contaminated underground zone to a bioactive zone at the ground surface above the contaminated underground zone, said process comprising,
    forming a pneumatic screen by injecting, at positions around the circumference of the contaminated underground zone, screening gas into the ground at a flow rate sufficient to substantially direct the flow of the stripping gas which has been used to remove said volatilized pollutants toward said bioactive zone above the underground zone.

4. Process according to claim 3, wherein the contaminated underground zone comprises a body of contaminated ground water having extending therefrom a plume formed by lateral diffusion of the contaminated ground water, and wherein the bioactive zone overlies a downstream portion of the plume having a relatively low concentration of pollutants, wherein the stripping gas is directed to said low contaminant concentration portion of the plume and wherein the pneumatic screen effectively circumscribes said outflowing stripping gas, wherein the flow of volatilized pollutants is effectively directed to said bioactive zone.

5. Process for removing pollutants from an underground zone comprising said pollutants thereof, said process comprising,
    placing at least one substantially vertical stripping gas pipe extending from above ground surface into the ground at the level of or below said underground zone and in the vicinity of said underground zone,
    placing a plurality of substantially vertical screening gas pipes extending from above ground surface into the ground at the same or higher level than the at least one stripping gas pipe, said screening pipes being located circumferentially surrounding the underground zone and surrounding said at least one stripping gas pipe,
    forcing stripping gas into the at least one stripping gas pipe to contact the underground zone and strip pollutants therefrom and return the stripped pollutants substantially towards the surface above the underground zone, wherein at least a portion of the stripping gas passing through the underground zone tends to have a horizontal flow component flowing towards the plurality of screening gas pipes, and
    forcing screening gas to flow through and from the screening gas pipes, wherein at least a portion of the screening gas comprises a horizontal flow component flowing towards the said horizontal flow component of the stripping gas,
    whereby the screening gas forms a pneumatic screen which at least substantially prevents flow of stripping gas comprising pollutants from flowing beyond the circumferential boundary of the underground zone.

6. Process according to claim 5, which further comprises controlling the flow of the horizontal flow component of the screening gas to redirect the horizontal flow component of the stripping gas towards a desired area.

* * * * *